US012600117B2

(12) United States Patent
Pedrazzoli et al.

(10) Patent No.: US 12,600,117 B2
(45) Date of Patent: Apr. 14, 2026

(54) HYBRID ROOFING MEMBRANE AND METHODS OF MAKING SAME

(71) Applicant: JOHNS MANVILLE, Denver, CO (US)

(72) Inventors: Diego Pedrazzoli, Littleton, CO (US); Lichih R Peng, Littleton, CO (US); Lance Wang, Parker, CO (US); Jawed Asrar, Englewood, CO (US)

(73) Assignee: Johns Manville, Denver, CO (US)

( * ) Notice: Subject to any disclaimer, the term of this patent is extended or adjusted under 35 U.S.C. 154(b) by 0 days.

(21) Appl. No.: 18/595,924

(22) Filed: Mar. 5, 2024

(65) Prior Publication Data

US 2024/0198645 A1     Jun. 20, 2024

Related U.S. Application Data

(63) Continuation of application No. 17/220,657, filed on Apr. 1, 2021, now Pat. No. 11,951,716.

(51) Int. Cl.
B32B 27/08          (2006.01)
B32B 27/30          (2006.01)
          (Continued)

(52) U.S. Cl.
CPC ............ B32B 27/08 (2013.01); B32B 27/304 (2013.01); B32B 27/32 (2013.01); B32B 37/153 (2013.01);
          (Continued)

(58) Field of Classification Search
CPC ....... B32B 27/08; B32B 27/304; B32B 27/32; B32B 37/153; B32B 2419/06; C08L 23/00; C08L 27/06; E04D 5/10
See application file for complete search history.

(56) References Cited

U.S. PATENT DOCUMENTS 4,778,856 A     10/1988   Chen et al.
6,204,334 B1 *   3/2001   Cinadr ................... C08L 27/24
                                                              525/239
(Continued)

FOREIGN PATENT DOCUMENTS

WO          2007043082 A2     4/2007
WO          2021102637 A1     6/2021
WO     WO-2022178873 A1 *   9/2022

OTHER PUBLICATIONS

Omnexus, Density of Plastics, https://omnexus.specialchem.com/polymer-property/density (Year: 2025).*

(Continued)

*Primary Examiner* — Michael Zhang
(74) *Attorney, Agent, or Firm* — Robert D. Touslee

(57)          ABSTRACT

A roofing membrane includes a thermoplastic polyolefin (TPO) layer and a polyvinyl chloride (PVC) layer. The TPO layer forms a bottom layer of the roofing membrane, and the PVC layer is positioned atop the TPO layer so that the PVC layer forms a top layer of the roofing membrane. The TPO layer and the PVC layer are configured to be chemically compatible so that the TPO layer and the PVC layer are chemically bonded and function as a single roofing membrane. Compatibilizing includes at least one of (i) adding a compatibilizing agent to at least one of the TPO material and the PVC material prior to extrusion and (ii) positioning at least one compatibilizing film, prior to bonding, between the TPO material and the PVC material.

16 Claims, 3 Drawing Sheets

(51) Int. Cl.

| | |
|---|---|
| *B32B 27/32* | (2006.01) |
| *B32B 37/15* | (2006.01) |
| *C08L 23/00* | (2006.01) |
| *C08L 27/06* | (2006.01) |
| *E04D 5/10* | (2006.01) |

(52) U.S. Cl.

CPC .............. *C08L 23/00* (2013.01); *C08L 27/06* (2013.01); *E04D 5/10* (2013.01); *B32B 2419/06* (2013.01)

(56) References Cited

U.S. PATENT DOCUMENTS

| | | | |
|---|---|---|---|
| 11,951,716 B2 | 4/2024 | Pedrazzoli et al. | |
| 2002/0187693 A1 | 12/2002 | Cherry | |
| 2007/0194482 A1* | 8/2007 | Douglas ................. | B32B 27/32 |
| | | | 264/173.14 |
| 2008/0029210 A1 | 2/2008 | Swei et al. | |
| 2008/0182074 A1* | 7/2008 | Pasquale ................ | B32B 25/08 |
| | | | 428/317.1 |
| 2009/0291249 A1 | 11/2009 | Mehta et al. | |
| 2014/0273682 A1* | 9/2014 | Xing ......................... | E04D 5/10 |
| | | | 156/313 |
| 2016/0230340 A1* | 8/2016 | Zheng ..................... | C08L 51/06 |
| 2018/0330222 A1* | 11/2018 | Marciello .......... | G06K 19/0723 |
| 2018/0346765 A1* | 12/2018 | Scanish ...................... | C09J 7/50 |
| 2019/0010367 A1* | 1/2019 | Pucci ..................... | C09J 123/26 |
| 2022/0055264 A1* | 2/2022 | Meree ...................... | E04D 5/10 |
| 2022/0098866 A1 | 3/2022 | Yang | |

OTHER PUBLICATIONS

Dow, Engage Data Sheet, 2015 (Year: 2015).*

* cited by examiner

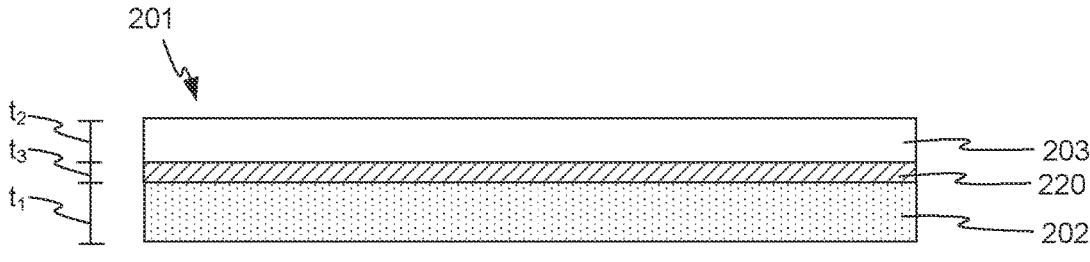
FIG. 3
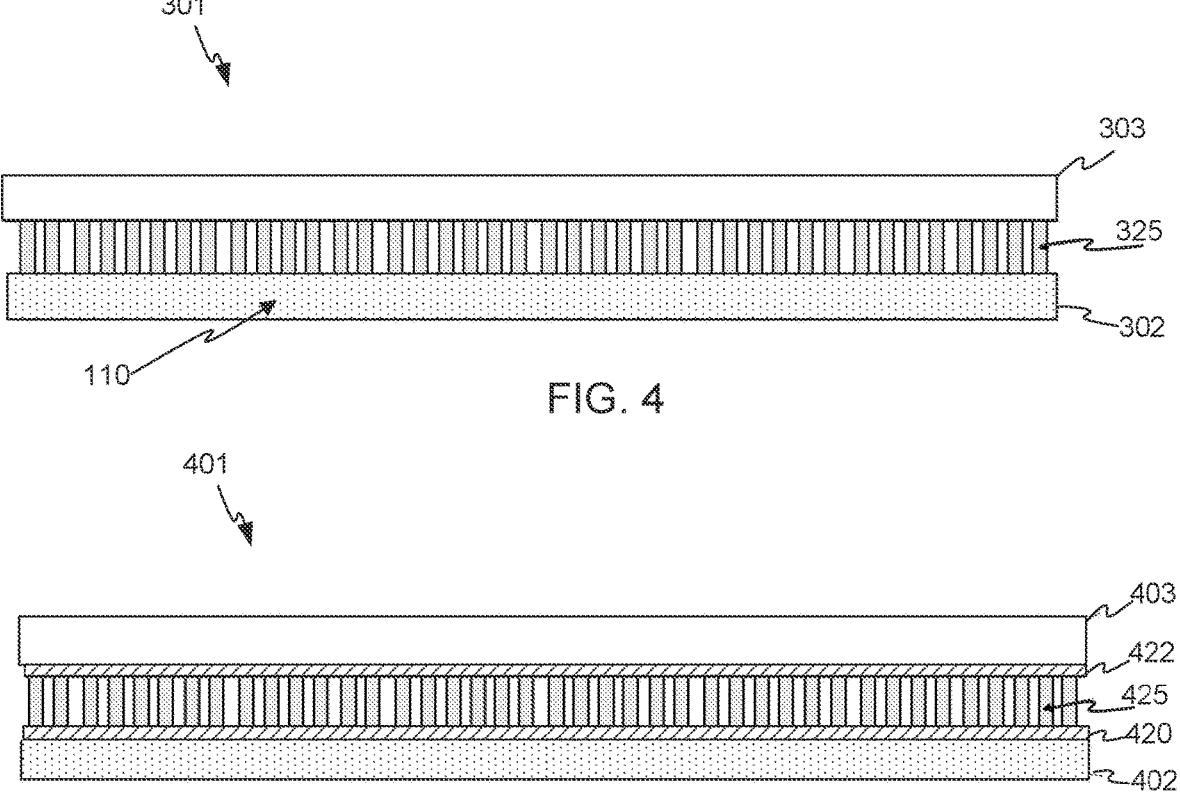
FIG. 4
FIG. 5

HYBRID ROOFING MEMBRANE AND METHODS OF MAKING SAME

BACKGROUND

Cross Reference to Related Applications

This application is a continuation of U.S. patent application Ser. No. 17/220,657, filed Apr. 1, 2021, the entire disclosure of which is hereby incorporated by reference herein for all purposes.

BACKGROUND OT THE INVENTION

Roofing membranes are commonly used for roofing systems of building and structures. Roofing membranes are often applied to the building or structure's roof to prevent leaks and/or to provide aesthetic appeal. Roofing membranes are commonly made of various synthetic rubber materials, modified bitumen, or thermoplastic materials.

Low slope or flat roofs are typically covered with waterproofing materials. In a "built up roof" (BUR), multiple components such as liquid asphalt and ballast are separately applied to the roof, often over an insulation layer. An alternative to the built-up roof is to use a "singly-ply" membrane. Roofing membranes may be a single ply membrane, which may be a large, flat, flexible membrane supplied on a roll, and rolled out on top of the roof, typically on top of the insulation layer. The term "single-ply" is used to describe a roof having a single application of a membrane, but the membrane itself may comprise multiple layers such as polymer layers, reinforcing layers, adhesive layers, coatings, and the like. Typical base materials used for single ply membranes are thermoplastic polyolefin (TPO), ethylene propylene diene monomer (EPDM), polyvinyl chloride (PVC), and modified bitumen.

BRIEF SUMMARY

The embodiments described herein provide a roofing membrane and methods of forming the same. According to one embodiment, a roofing membrane includes a thermoplastic polyolefin (TPO) layer that forms a bottom layer of the roofing membrane. The roofing membrane includes a polyvinyl chloride (PVC) layer positioned atop the TPO layer so that the PVC layer forms a top layer of the roofing membrane. The TPO layer and the PVC layer are configured to be chemically compatible so that the TPO layer and the PVC layer are chemically bonded and function as a single roofing membrane. The roofing membrane may include a compatibilizing agent being added to at least one of the TPO layer and the PVC layer. The compatibilizing agent may be homogeneously dispersed within the at least one of the TPO layer and the PVC layer. The roofing membrane may include the TPO layer having a top surface opposite the bottom layer and the PVC layer having a bottom surface opposite the top layer, and the compatibilizing agent being concentrated toward at least one of the TPO top surface and the PVC bottom surface. A ply adhesion of the TPO layer and the PVC layer may be at least two times greater than a reference TPO layer and PVC layer that are devoid of the compatibilizing agent. The compatibilizing agent may be added in amount of from 0.1 wt % to 30 wt % into the at least one of the TPO layer and the PVC layer, or the compatibilizing agent may be added in amount of from 1 wt % to 30 wt % into the at least one of the TPO layer and the PVC layer. The compatibilizing agent may be added in amount of from 0.05 wt % to 15 wt % with respect to the total membrane, or the compatibilizing agent may be added in amount of from 0.5 wt % to 15 wt % with respect to the total membrane. The compatibilizing agent may be at least one chosen from styrene-ethylene/butylene-styrene (SEBS), polypropylene grafted maleic anhydride (PPgMA), polyethylene grafted maleic anhydride (PEgMA), Elvaloy® ketone ethylene ester (KEE), chlorinated polyethylene (CPE), styrene-butyldiene-styrene (SBS), and combinations thereof. The compatibilizing agent may be SEBS and a ply adhesion of the TPO layer and the PVC layer may be at least four times greater than a reference TPO layer and PVC layer devoid of SEBS. The TPO layer may have a first thickness and the PVC layer may have a second thickness, wherein the second thickness is at most equal to the first thickness. A compatibilizing film may be disposed between the TPO layer and the PVC layer. The compatibilizing film thickness may be from 0.5 mil to 5 mil. The compatibilizing film may include at least one polymer chosen from styrene-ethylene/butylene-styrene (SEBS), polypropylene grafted maleic anhydride (PPgMA), polyethylene grafted maleic anhydride (PEgMA), Elvaloy® ketone ethylene ester (KEE), chlorinated polyethylene (CPE), styrene-butyldiene-styrene (SBS), and combinations thereof. The roofing membrane may further include positioning a reinforcing scrim between the TPO layer and the PVC layer.

According to another embodiment, a roofing membrane includes a thermoplastic polyolefin (TPO) layer, a polyvinyl chloride (PVC) layer adjacent to the TPO layer, and at least one compatibilizing film disposed between the TPO layer and the PVC layer. The at least one compatibilizing film may include at least one polymer chosen from styrene-ethylene/butylene-styrene (SEBS), polypropylene grafted maleic anhydride (PPgMA), polyethylene grafted maleic anhydride (PEgMA), Elvaloy® ketone ethylene ester (KEE), chlorinated polyethylene (CPE), styrene-butyldiene-styrene (SBS), and combinations thereof. The roofing membrane may further include a reinforcing scrim disposed between the TPO layer and the PVC layer. The reinforcing scrim may be disposed between a first compatibilizing film and a second compatibilizing film, the first compatibilizing film adjacent to the TPO layer and the second compatibilizing film adjacent to the PVC layer. The at least one compatibilizing film may be attached without the use of an adhesive. A ply adhesion of the PTO layer and PVC layer may be at least two times greater than a reference TPO layer and PVC layer that is devoid of the at least one compatibilizing film there between. A compatibilizing agent may be added to at least one of the TPO layer and the PVC layer.

According to yet another embodiment, a method of making a roofing membrane is provided. The method includes extruding a thermoplastic polyolefin (TPO) material to form a first layer of the roofing membrane. The method includes extruding a polyvinyl chloride (PVC) material atop the TPO material to form a second layer of the roofing membrane. The method includes compatibilizing at least one of the TPO material and the PVC material so that the TPO material is chemically bondable to the PVC material. The method includes bonding the TPO material to the PVC material without the use of adhesives to form the roofing membrane. Compatibilizing may include at least one of adding a compatibilizing agent to at least one of the TPO material and the PVC material and positioning at least one compatibilizing film, prior to bonding, between the TPO material and the PVC material. The compatibilizing agent may be added in amount of from 1 wt % to 30 wt % into the at least one of the TPO material and the PVC material. The compatibilizing agent may be added in amount of from 0.5 wt % to 15 wt % with respect to the total membrane. The compatibilizing agent may be at least one chosen from styrene-ethylene/butylene-styrene (SEBS), polypropylene grafted maleic anhydride (PPgMA), polyethylene grafted maleic anhydride (PEgMA), Elvaloy® ketone ethylene ester (KEE), chlorinated polyethylene (CPE), styrene-butyldiene-styrene (SBS), and combinations thereof. The at least one compatibilizing film may include at least one polymer chosen from styrene-ethylene/butylene-styrene (SEBS), polypropylene grafted maleic anhydride (PPgMA), polyethylene grafted maleic anhydride (PEgMA), Elvaloy® ketone ethylene ester (KEE), chlorinated polyethylene (CPE), styrene-butyldiene-styrene (SBS), and combinations thereof. The method may further include positioning a reinforcing scrim between the TPO material and the PVC material. The reinforcing scrim may be positioned between a first compatibilizing film and a second compatibilizing film, the first compatibilizing film adjacent to the TPO material and the second compatibilizing film adjacent to the PVC material.

BRIEF DESCRIPTION OF THE DRAWINGS

The present technology is described in conjunction with the appended figures:

FIG. 3 illustrates a cross-sectional view of a hybrid roofing membrane having a compatibilizing film disposed between a TPO layer and a PVC layer.

FIG. 4 illustrates a cross-sectional view of a hybrid roofing membrane having a reinforcing scrim disposed between a TPO layer and a PVC layer.

FIG. 5 illustrates a cross-sectional view of a hybrid roofing membrane having a reinforcing scrim disposed between a TPO layer and a PVC layer, the reinforcing scrim positioned between first and second compatibilizing films.

Figure 1:
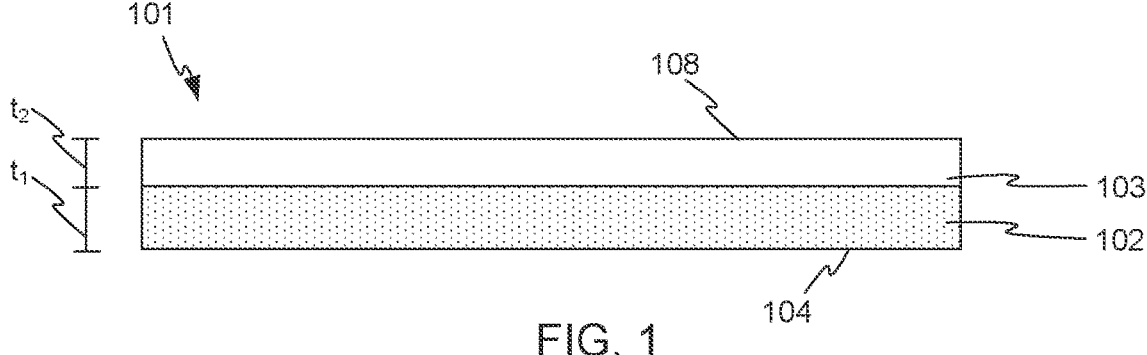
FIG. 1 illustrates a cross-sectional view of a hybrid roofing membrane according to the processes and products described herein.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

The embodiments described herein relate to roofing membranes, and specifically hybrid roofing membranes including a TPO layer and a PVC layer. In some embodiments, the roofing membrane may include at least one of the TPO layer and the PVC layer configured to be chemically compatible so that the TPO layer and the PVC layer are chemically bonded and function as a single roofing membrane. A single roofing membrane may also be referred to as a single-ply roofing membrane. Chemical compatibility may include a compatibilizing agent added to at least one of the TPO layer and the PVC layer. Alternatively or additionally, chemical compatibility may include at least one compatibilizing film disposed between the TPO layer and the PVC layer. In a specific embodiment, the compatibilizing agent and/or the compatibilizing film includes at least one polymer chosen from styrene-ethylene/butylene-styrene (SEBS), polypropylene grafted maleic anhydride (PPgMA), polyethylene grafted maleic anhydride (PEgMA), Elvaloy® ketone ethylene ester (KEE), chlorinated polyethylene (CPE), styrene-butyldiene-styrene (SBS), and combinations thereof. In other embodiments, a method of making the roofing membrane includes extruding a TPO first layer and a PVC second layer, compatibilizing at least one of the first and second layers, and bonding the TPO and PVC without the use of adhesives to form the roofing membrane.

Roofing systems often include various materials and/or layers in addition to the roofing membranes. These layers/materials are typically positioned under the roofing membrane and may include support members (e.g., wood and/or metal beams), insulation layers (e.g., foam and/or other insulating boards), and/or other boards or members. The roofing membrane may be coupled with one or more of these materials via ballasting, mechanically fastening, adhesive bonding, heat welding, and the like. Common roofing membranes include various materials, including thermoset materials such as ethylene propylene diene monomer (EPDM), or thermoplastic materials such as thermoplastic polyolefin (TPO) and polyvinyl chloride (PVC). The embodiments described herein may find particular usefulness for roofing membranes constructed of TPO and PVC materials, although the embodiments may be used for other thermoset and/or thermoplastic roofing membranes as desired.

PVC roofing membranes advantageously offer high chemical stability and fire resistance with extended longevity, for example upwards of 25 to 30 years. Generally, PVC roofing membranes are less commonly employed than TPO roofing membranes due to their higher manufacturing cost. Moreover, PVC adhesion strength with respect to the typical substrates is not as high as using TPO. Examples of typical substrates include, but are not limited to, oriented strand board (OSB) and polyisocyanurate (polyiso). TPO provides mechanical and physical properties suitable as roofing membranes at a lower cost, but with chemical stability and fire resistance that is much lower than PVC roofing membranes. Previously roofing membranes have combined a PVC cap with a TPO core in order to offer high chemical stability and fire resistance from the exposed cap, while maintaining elevated adhesive strength and lower cost of the core.

Although PVC and TPO are both thermoplastic polymers, they exhibit significantly different mechanical and physical properties. Moreover, the typical formulations of TPO and PVC used for roofing applications are not chemically compatible. Prior attempts to combine PVC and TPO layers in a single-ply membrane resulted in a low ply adhesion, insufficient to provide adequate mechanical properties and wind up-lift performance. The present disclosure solves the problem of ply adhesion for a hybrid roofing membrane by compatibilization of at least one of the PVC and TPO. This compatibilization may be implemented by (i) incorporating a compatibilizing agent in one of the two polymers and/or (ii) using a compatibilizing polymer film, e.g., having a thickness on the order of about 0.5 mil to about 5 mil, or about 1 mil to about 3 mil, sandwiched between the TPO and PVC layers. This compatibilization by providing an agent within a membrane layer (TPO and/or PVC) itself or as a film adjacent to the membrane layer, without being bound by theory, behaves as a polymeric surfactant to lower surface tension and/or affects surface polarity, which in turn promotes interfacial adhesion between the TPO and PVC membrane layers.

Hybrid Roofing Membranes

Figure 2:
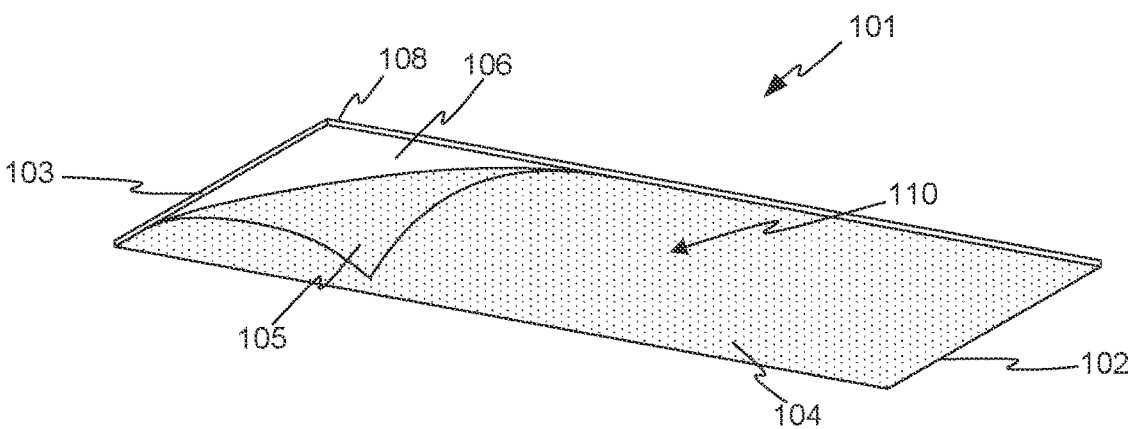
FIG. 2 illustrates a perspective view of the hybrid roofing membrane of FIG. 1.

A hybrid roofing membrane 101, as shown in FIGS. 1 and 2, includes two layers in a single ply roofing membrane. FIG. 1 illustrates a cross-sectional view of the roofing membrane 101, which includes a TPO layer 102 that forms a bottom layer of the roofing membrane 101. Roofing membrane 101 further includes a PVC layer 103 positioned atop the TPO layer so that the PVC layer forms a top layer of the roofing membrane 101. Layers 102 and 103 form a single ply. Layer 102 has a first thickness $t_1$ while layer 103 has a second thickness $t_2$. The thickness $t_2$ may be the same as, or different than, thickness $t_1$. For example, generally thickness $t_2$ of the TPO layer may be greater than thickness $t_1$ of the PVC layer. Alternatively, thickness $t_1$ may be greater than $t_2$. In some embodiments, thickness $t_2$ is equal to $t_1$.

FIG. 2 illustrates a perspective view of roofing membrane 101 with PVC layer 103 atop TPO layer 102. The TPO layer 102 and the PVC 103 layer are configured to be chemically compatible so that the TPO layer 102 and the PVC layer 103 are mechanically interlocked, exhibit polymer chain entanglement, and/or chemically bonded, which enables the PVC layer 103 and TPO layer 120 to function as a single roofing membrane. In some embodiments, without being bound by theory, macromolecular chains of the PVC layer and the TPO layer tend to diffuse and entangle together when the PVC and TPO polymers are in the molten state during the manufacturing process. Once the TPO-PVC roofing membrane is brought back to room temperature, a strong interface is formed between TPO and PVC. This entanglement may be additionally or alternatively strengthened, in some embodiments, by anywhere from strong covalent bonds to weak van der Waals interactions formed at the TPO-PVC interface. The mechanical and/or chemical mechanisms may depend on the chemical formulation of the polymers used for the PVC layer and the TPO layer, as well as on the manufacturing process used to laminate the PVC layer and the TPO layer into a roofing membrane. TPO layer 102 may include a compatibilizing agent 110 homogeneously dispersed within the TPO layer 102. In other embodiments, a compatibilizing agent 110 may be homogeneously dispersed within the PVC layer 103. In yet other embodiments, one or more compatibilizing agent(s) 110 may be homogeneously dispersed within the TPO layer 102 and the PVC layer 103. TPO layer 102 has a top surface 105 opposite the bottom layer 104. Top surface 105 of TPO layer 102 is shown "peeled away" only for illustrative purposes. Layers 102 and 103 of hybrid roofing membrane 101 are securely bonded together. PVC layer 103 has a bottom surface 106 opposite the top surface 108. In the example shown in FIG. 2, the compatibilizing agent may be concentrated toward at least one of the TPO top surface 105 and the PVC bottom surface 106.

Compatibilizing Agent in Layer of TPO and/or Layer of PVC

In some embodiments, a compatibilizing agent is added directly to the TPO layer and/or the PVC layer prior to extrusion of the layer(s) for the hybrid roofing membrane. Suitable compatibilizing agents enhance the layers ability to bond to another layer and to increase the ply adhesion to enhance properties and performance, such as tensile and tear resistance, wind up-lift performance, dimensional stability, and puncture resistance. The compatibilizing agent may be at least one chosen from styrene-ethylene/butylene-styrene (SEBS), polypropylene grafted maleic anhydride (PPgMA), polyethylene grafted maleic anhydride (PEgMA), Elvaloy® ketone ethylene ester (KEE), chlorinated polyethylene (CPE), styrene-butyldiene-styrene (SBS), and combinations thereof.

The compatibilizing agent 110 of FIG. 2 may be added in amount of from 1 wt % to 30 wt % into the at least one of the TPO layer and the PVC layer. For example, the percentage of compatibilizing agent based upon the layer weight (the layer being one of the TPO layer and the PVC layer) in the hybrid roofing membrane described herein may range from about 1 wt % to about 30 wt %, or may be any amount in between such as about 5 wt % to about 25 wt %, about 10 wt % to about 20 wt %, about 12 wt % to about 18 wt %, or about 14 wt % to about 16 wt %. In some embodiments, the percentage of compatibilizing agent based upon the layer weight in the hybrid roofing membrane is about 15 wt %.

The compatibilizing agent 110 may be added in amount of from 0.5 wt % to 15 wt % with respect to the weight of the total hybrid roofing membrane. The percentage of compatibilizing agent with respect to the weight of the total hybrid roofing membrane (having the TPO layer and the PVC layer) described herein may range from about 1 wt % to about 15 wt %, or may be any amount in between such as about 2 wt % to about 13 wt %, about 5 wt % to about 10 wt %, about 6 wt % to about 9 wt %, or about 7 wt % to about 8 wt %. In some embodiments, the percentage of compatibilizing agent with respect to the weight of the total hybrid roofing membrane is about 7.5 wt %.

In embodiments having a compatibilizing agent added directly to at least one of the TPO layer and the PVC layer prior to extrusion of the layer or layers for the hybrid roofing membrane, a compatibilizing film and/or a reinforcing scrim may also be positioned between the TPO layer and the PVC layer. Compatibilizing films and reinforcing scrims will be discussed in more detail below.

Compatibilizing Film Disposed Between TPO Layer and PVC Layer

Another hybrid roofing membrane 201 is illustrated in FIG. 3. Hybrid roofing membrane 201 includes a compatibilizing film 220 disposed between TPO layer 202, having thickness $t_1$, and PVC layer 203, having thickness $t_2$. Compatibilizing film 220 has a thickness $t_3$ ranging from about 0.5 mil to about 5 mil. Thickness $t_3$ is less than thickness $t_1$ and $t_2$.

The compatibilizing film 220 is directly disposed between the TPO layer 202 and the PVC layer 203. In some embodiments, the compatibilizing film 220 may be co-extruded with one or both of the TPO and PVC layers of the hybrid roofing membrane. The compatibilizing film may be a polymeric film including at least one polymer chosen from styrene-ethylene/butylene-styrene (SEBS), polypropylene grafted maleic anhydride (PPgMA), polyethylene grafted maleic anhydride (PEgMA), Elvaloy® ketone ethylene ester (KEE), chlorinated polyethylene (CPE), styrene-butyldiene-styrene (SBS), and combinations thereof.

In embodiments having a compatibilizing film disposed between the TPO layer and the PVC layer of the hybrid roofing membrane, a reinforcing scrim may also be positioned between at least one compatibilizing film and one or both of the TPO layer and the PVC layer. Reinforcing scrims will be discussed in more detail below.

Reinforcing Scrim for Hybrid Roofing Membrane

Another hybrid roofing membrane 301 is illustrated schematically in FIG. 4. Hybrid roofing membrane 301 includes a reinforcing scrim 325 disposed between TPO layer 302 and PVC layer 303. A compatibilizing agent is included in at least one of the TPO layer 302 and the PVC layer 303, and may be homogeneously dispersed throughout the layer or concentrated near at least one surface adjacent the reinforcing scrim. In the example shown in FIG. 4, compatibilizing agent 110 is included in TPO layer 302. Additionally or alternatively, a compatibilizing agent may be included in the PVC layer 303. The compatibilizing agent may be chosen from styrene-ethylene/butylene-styrene (SEBS), polypropylene grafted maleic anhydride (PPgMA), polyethylene grafted maleic anhydride (PEgMA), Elvaloy® ketone ethylene ester (KEE), chlorinated polyethylene (CPE), styrene-butyldiene-styrene (SBS), and combinations thereof.

Hybrid roofing membrane 401 is illustrated schematically in FIG. 5. Hybrid roofing membrane 401 includes a reinforcing scrim 425 disposed between TPO layer 402 and PVC layer 403. In the example shown in FIG. 5, two compatibilizing films 420 and 422 are positioned between TPO layer 402 and PVC layer 403, and the reinforcing scrim 425 is positioned between compatibilizing film 420 and 422. In other words, the reinforcing scrim 425 is disposed between a first compatibilizing film 420 and a second compatibilizing film 422, where the first compatibilizing film 420 is adjacent to the TPO layer 402 and the second compatibilizing film 422 is adjacent to the PVC layer 403. Each of compatibilizing films 420 and 422 may be a polymeric film including at least one polymer chosen from styrene-ethylene/butylene-styrene (SEBS), polypropylene grafted maleic anhydride (PPgMA), polyethylene grafted maleic anhydride (PEgMA), Elvaloy® ketone ethylene ester (KEE), chlorinated polyethylene (CPE), styrene-butyldiene-styrene (SBS), and combinations thereof.

Optionally, a compatibilizing agent (not shown) may be included in the hybrid roofing membrane of FIG. 5. The compatibilizing agent may be included in one or both of the TPO layer 402 and the PVC layer 403, and may be homogeneously dispersed throughout the layer or concentrated near at least one surface adjacent one or both of the compatibilizing films. The compatibilizing agent may be chosen from styrene-ethylene/butylene-styrene (SEBS), polypropylene grafted maleic anhydride (PPgMA), polyethylene grafted maleic anhydride (PEgMA), Elvaloy® ketone ethylene ester (KEE), chlorinated polyethylene (CPE), styrene-butyldiene-styrene (SBS), and combinations thereof.

Surface Treating a TPO Surface for Hybrid Roofing Membrane

Alternatively or additionally, at least one of the TPO top surface 105 and the PVC bottom surface 106, referring again to FIG. 2, is treated with a surface preparation technique. The surface preparation technique may be a treatment including exposing a surface to be bonded with plasma or ozone to make that surface more polar. As a TPO material surface is generally non-polar, the surface treatment enhances the treated TPO surface to increase polarity to more closely match with the polarity of the PVC bottom surface. By increasing the polarity of the TPO material, the surface is functionalized so as to enhance chemical and physical bonding to the PVC layer, therefore making the TPO and PVC layers more compatible. A plasma treatment may include generic air or different gases for tailoring functionalization. In some embodiments, the plasma treatment includes flowing argon (Ar) gas. Advantageously, plasma treatment can be in open air (i.e. atmospheric plasma) and therefore would not require a dedicated plasma chamber. In this way, the continuous plasma process can be advantageously matched to the roofing membrane line speed without changing or disrupting the existing manufacturing technology and equipment. The selected plasma treatment can be optimized to coat one or both of the TPO layer and the PVC layer after extrusion of each layer and before the TPO layer and the PVC layer are laminated together to make the hybrid roofing membrane. In some embodiments, either a monomer or functional chemical groups are formed on the TPO layer and/or the PVC layer surfaces as a result of the plasma treatment. In non-limiting examples, carbonyl, carboxyl, and hydroxyl groups are formed on the TPO layer and/or PVC layer, using a power input of from about 10 to about 200 W and a flow rate that depends on the molecular weight of the monomer or functional chemical groups as well as operating conditions such as temperature, power, and line speed. For example, a flow rate from about 1 to about 50 sccm may be used. In yet other embodiments, a surface treatment may include a Corona treatment by passing one or both of the TPO layer and the PVC layer through a corona discharge.

Hybrid Roofing Membrane Properties

In any of the embodiments described above, the hybrid roofing membrane including a TPO layer and a PVC layer (and optionally one or more compatibilizing films and/or a reinforcing scrim) is advantageously manufactured without the use of an adhesive. In embodiments schematically exemplified in FIGS. 1 and 2, a ply adhesion of the TPO layer and the PVC layer hybrid membrane is at least two times greater than a reference TPO layer and PVC layer that are not modified with the compatibilizing agent. In an exemplary embodiment where the compatibilizing agent is SEBS, a ply adhesion of the TPO layer and the PVC layer is at least five times greater than a reference TPO layer and PVC layer without SEBS. Ply adhesion may be measured according to ASTM D1876-08, by placing one rectangular TPO/PVC sample (1"×12") on the Instron universal machine so as to peel the TPO layer from the PVC layer under controlled conditions (at a cross-head speed of about 10"/min). Five specimens or more are tested per each sample type, while the average and maximum peel strength (in this case corresponding to the ply adhesion) are evaluated. Significant variations in ply adhesion are considered valid only when the average and/or maximum ply adhesion is at least 10% different than the corresponding adhesion measured on the control sample. The control sample included a TPO/PVC system, where the TPO layer and the PVC layer each have not been modified with compatibilizing agent and without a compatibilizing film between the TPO layer and the PVC layer)

As mentioned, adhesives are not needed to provide bonding and sufficient ply adhesion for the layers of the present disclosure. In conventional roofing membrane systems, it has been necessary to apply an adhesive material and/or position an adhesive material layer adjacent one material layer to adhesively bond or laminate with another material layer such as, for example adhesively bonding an EPDM layer or a reinforcing scrim to a TPO layer. The material layers of the present disclosure provide physical and/or chemical mechanisms for bonding, where physical mechanisms may include mechanically interlocking and/or polymer chain entangling and chemical mechanisms may include covalent bonds and/or weak van der Waals interactions, that advantageously allows the omission of an adhesive. The hybrid roofing membrane according to the present disclosure is devoid of or substantially devoid of adhesive materials. An adhesive or adhesive material may be any material, such as an adhesive tape or liquid, provided between membrane material layers so as to provide the bonding mechanism for attachment of the membrane material layers. Conventional adhesive materials, particularly adhesive tapes or adhesive liquids, were used to provide sufficient strength to resist the short and long term stresses, oxidation resistance, hydrolysis, and chemical breakdown. Such adhesive materials include, but are not limited to, adhesive tapes, adhesive films, or adhesive composition layers. An example of adhesive tape is butyl tape. Some adhesive materials used conventionally required additional processing steps such as heating or applying pressure to ensure the adhesive material would be provide adequate bonding in the multi-layer system. Example hot melt adhesives may include polypropylene, polybutylene terephthalate, or polyethylene terephthalate modified by the condensation of longer-chain diols and/or isophthalic acid or aliphatic dicarboxylic acids. Other examples include adhesive composition layers that may include by weight about 8% styrene butadiene styrene rubber, about 20% filler, about 10% oil, and about 62% flux asphalt.

Method of Making Hybrid Roofing Membranes

Figure 6:
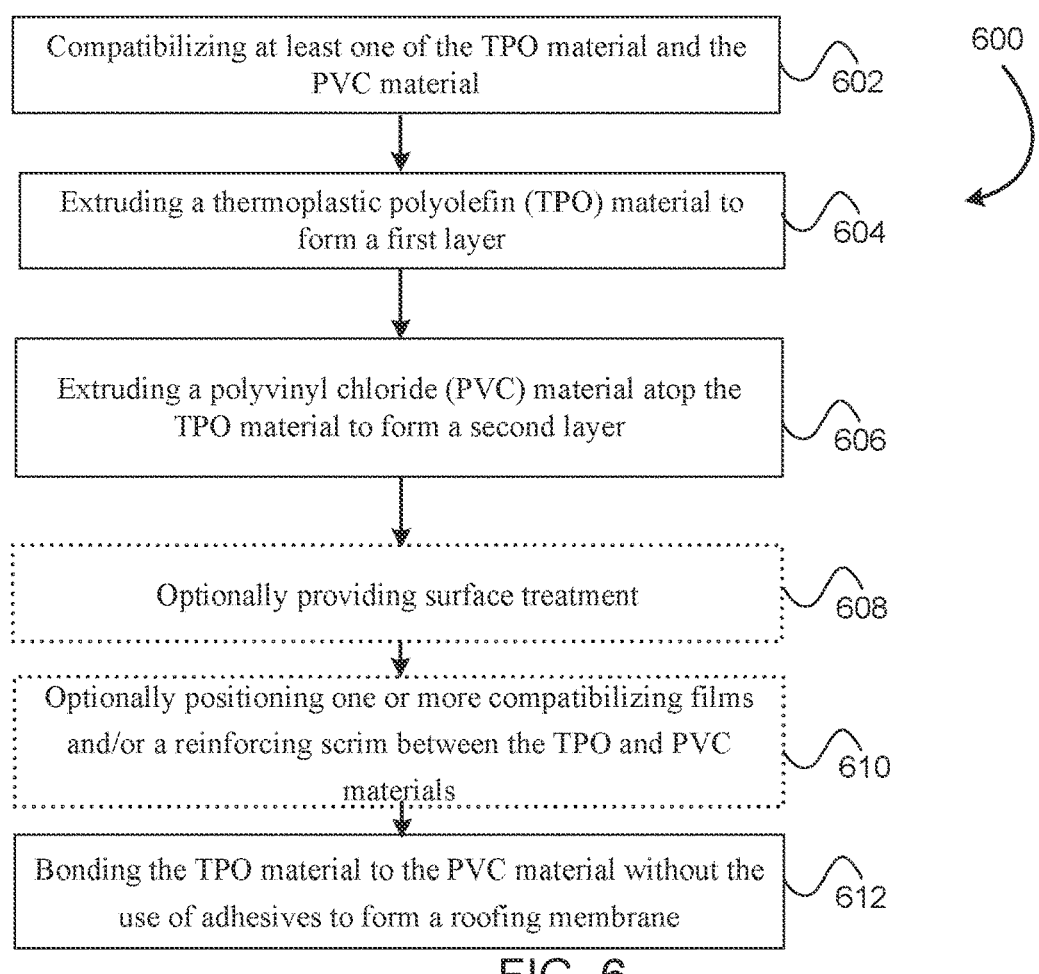
FIG. 6 illustrates a method of making a hybrid roofing membrane described herein.

Referring now to FIG. 6, illustrated is a method 600 of making a hybrid roofing membrane. At block 602, at least one of the TPO material and the PVC material is compatibilized so that the TPO material is chemically bondable to the PVC material. Compatibilizing includes at least one of (i) adding a compatibilizing agent to at least one of the TPO material and the PVC material prior to forming the extruded layers and (ii) positioning at least one compatibilizing film, prior to bonding, between the TPO material and the PVC material.

At block 604, a thermoplastic polyolefin (TPO) material is extruded to form a first layer of the roofing membrane.

Figure 7:
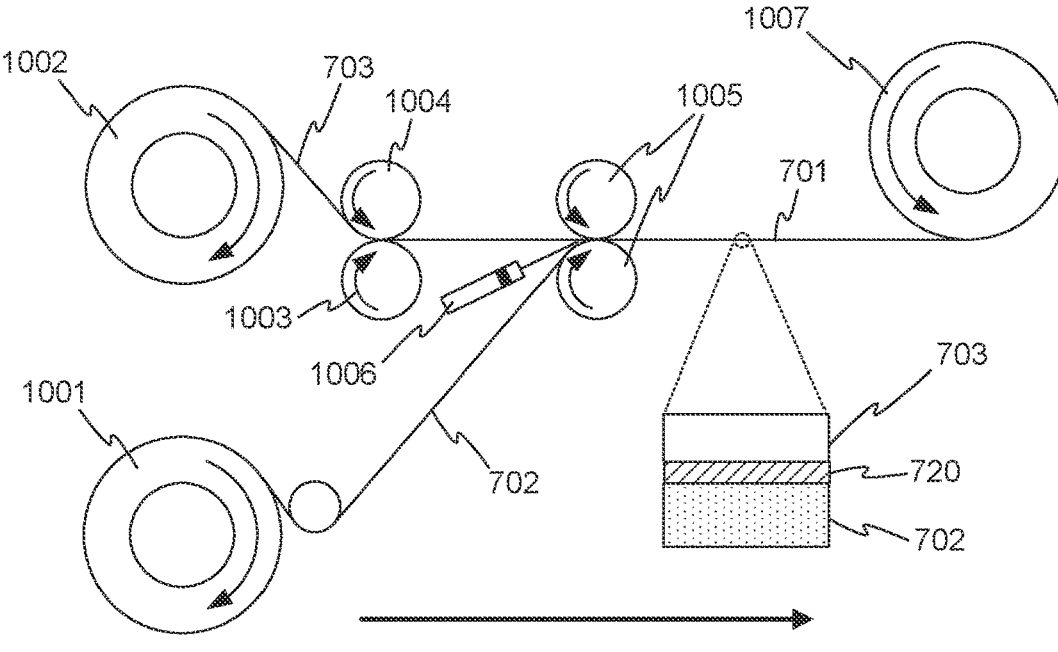
FIG. 7 illustrates a schematic view of a system for making a hybrid roofing membrane as described herein.

At block 606, a polyvinyl chloride (PVC) material is extruded to form a second layer of the roofing membrane. The PVC second layer is positioned atop the TPO material. This may be accomplished by extruding the PVC material at the same time as the TPO material in a co-extrusion operation. Alternatively, the PVC second layer may be extruded separately and then positioned onto the TPO first layer. An example of such an operation is shown in FIG. 7.

At block 608, optionally a surface treatment such as may be performed on the surface of the TPO layer to be laminated or on the surface of the PVC layer to be laminated or both surfaces. Optional surface treatments include treating surfaces with ozone, plasma, Corona treatment, or a combination thereof. At block 610, optionally one or more compatibilizing films and/or a reinforcing scrim may be positioned between the TPO and PVC materials.

At block 612, the TPO material is laminated to the PVC material. This process is performed without the use of adhesives, such as liquids or tapes, to form the hybrid roofing membrane. Any intervening optional layers as in block 608 that may be between the TPO first layer and the PVC second layer are also bonded without the use of adhesives. In conventional roofing membranes, where first and second layers are of the same material, applying heat and pressure may be used to laminate. Adhesives such as liquids or tapes are commonly used when unlike materials must be laminated. Advantageously, adhesives are not needed to provide bonding and sufficient ply adhesion for the layers of the present disclosure.

In the compatibilizing operation as in block 602 where a compatibilizing agent is added to at least one of the TPO material and the PVC material prior to forming the extruded layers, the compatibilizing agent may added in an amount of from 1 wt % to 30 wt % into the at least one of the TPO material and the PVC material. The compatibilizing agent is added in amount of from 0.5 wt % to 15 wt % with respect to the total membrane. The compatibilizing agent may be at least one chosen from styrene-ethylene/butylene-styrene (SEBS), polypropylene grafted maleic anhydride (PPgMA), polyethylene grafted maleic anhydride (PEgMA), Elvaloy® ketone ethylene ester (KEE), chlorinated polyethylene (CPE), styrene-butyldiene-styrene (SBS), and combinations thereof.

In the compatibilizing operation as in block 602 where at least one compatibilizing film is positioned, prior to bonding, between the TPO material and the PVC material, the at least one compatibilizing film may include at least one polymer chosen from styrene-ethylene/butylene-styrene (SEBS), polypropylene grafted maleic anhydride (PPgMA), polyethylene grafted maleic anhydride (PEgMA), Elvaloy® ketone ethylene ester (KEE), chlorinated polyethylene (CPE), styrene-butyldiene-styrene (SBS), and combinations thereof.

Optionally, the method 600 includes a surface treatment, such as at block 608, to increase polarity to at least one interior surface of the TPO and the PVC material layers. The method 600 may include treating an interior surface of the TPO material 402 prior to bonding the TPO material 402 and the PVC material 403. In the hybrid roofing membranes disclosed herein, the TPO material 402 is non-polar as compared with the polar PVC material 403. By increasing the polarity of the TPO material 402, by treating the surface with ozone, plasma, or Corona treatment as previously discussed, the surface is functionalized so as to enhance adherence to the PVC layer 403. The surface treating of the TPO material interior surface may be optionally performed after the operation at block 602, after the operation at block 606, or just before the optional operation at block 610.

In the optional operation as in block 610 where one or more compatibilizing films and/or a reinforcing scrim may be positioned between the TPO and PVC materials, any of the configurations as in FIGS. 1-5 are contemplated. For example the method 600 may include, as shown in FIG. 5, positioning a first compatibilizing film 420 and a second compatibilizing film 422, with the first compatibilizing film 420 being adjacent to the TPO material 402 and the second compatibilizing film 422 being adjacent to the PVC material 403. The method 600 may further include a reinforcing scrim 425 between the first and second compatibilizing films 420 and 422. As an alternative, the compatibilizing film 420 may be co-extruded with the TPO layer 402 and/or the PVC layer 403.

FIG. 7 illustrates one example technique for producing a roofing membrane in accordance with embodiments of the disclosure. In a specific embodiment, the hybrid roofing membrane is formed using apparatus as in FIG. 7. In this example, both the TPO layer 702 and the PVC layer 703 have been previously extruded and stored on rolls. A first roll 1001 of TPO layer 702 and a second roll 1002 of PVC layer 703 are mounted on shafts. As shown, PVC layer 703 may be fed to roller 1003, while TPO layer 702 is fed to roller 1005 where PVC layer 703 is also fed. Optionally, a compatibilizing film 720 may be dispensed between TPO layer 702 and PVC layer 703, for example by an extruder or other dispenser as shown schematically by dispenser 1006. As an alternative, the compatibilizing film 720 can be co-extruded with the TPO layer 702 and/or the PVC layer 703. This alternative advantageously provides that the compatibilizing film 720 does not need to be fed during the manufacturing process in a separate process step as the compatibilizing layer is already attached to TPO and/or PVC layers. The completed hybrid roofing membrane 701 is then wound onto a roll 1007 for packaging and shipment. An enlarged cross sectional view is depicted showing completed hybrid roofing membrane 701 having compatibilizing film 720 disposed between TPO layer 702 and PVC layer 703. As yet another alternative, not shown, the TPO layer may be extruded and collected on a roll, and then subsequently the PVC layer may be extruded directly onto the TPO layer before laminating the TPO layer and the PVC layer. In this alternative, the optional compatibilizing film can be co-extruded with the TPO layer and/or the PVC layer. Within this basic framework, many variations are possible. Any workable combination of steps and processes may be used.

EXAMPLES

A number of example hybrid roofing membranes were produced and characterized, as summarized in Tables 1 and 2 below.

TABLE 1

| | Ply Adhesion | | | |
|---|---|---|---|---|
| Compatibilization | Average Ply Adhesion (lbf/in) | Average Ply Adhesion Percentage Increase (%) | Maximum Ply Adhesion (lbf/in) | Maximum Ply Adhesion Percentage Increase (%) |
| No Compatibilization | | | | |
| Reference 50 mil membrane: 25 mil TPO/25 mil PVC | 1.8 | — | 2.2 | — |
| Compatibilizing Agent into TPO Layer 15 wt % Agent into TPO Layer; 7.5 wt % based on total membrane weight | | | | |
| SEBS | 9.2 | 511 | 14.2 | 645 |
| PPgMA | 2.8 | 156 | 4.8 | 218 |
| PEgMA | 7.4 | 411 | 13.5 | 614 |
| KEE | 5.9 | 328 | 9.3 | 423 |

Example 1. Compatibilizing Agent SEBS Added to TPO Layer

Compatibilizing agent styrene-ethylene/butylene-styrene (SEBS) was added to a first TPO layer for making a hybrid roofing membrane. The compatibilizing agent was added, mixed, and dispersed homogeneously in the amount of 15 wt % in the TPO first layer having a thickness of 25 mil. The amount of compatibilizing agent with respect to the total hybrid roofing membrane was 7.5 wt % for the membrane having a total thickness of 50 mil. Each of the TPO first layer and a PVC second layer had a thickness of 25 mil as formed using extrusion and calendaring methods as known in the art. Average ply adhesion was measured according to the T-peel test (ASTM D1876-08), the results of which are shown in Table 1. For the hybrid roofing membrane having the TPO layer/SEBS compatibilizing agent and the PVC layer bonded together, the average ply adhesion increased from 1.8 lbf/in (reference membrane having no compatibilizing agent) to 9.2 lbf/in. The maximum ply adhesion for the hybrid roofing membrane having 15 wt % SEBS compatibilizing agent in the TPO first layer increased from 2.2 lbf/in (reference membrane having no compatibilizing agent) to 14.2 lbf/in.

Example 2. Various Compatibilizing Agents in TPO Layer

Samples were made according to Example 1 with other compatibilizing agents added to the TPO layer in place of the SEBS. Polypropylene grafted maleic anhydride (PPgMA), polyethylene grafted maleic anhydride (PEgMA), and Dupont Elvaloy ketone ethylene ester (KEE) were dispersed into the TPO first layer prior to extrusion. The weight percentage of each compatibilizing agent added was 7.5 wt % with respect to the total hybrid roofing membrane having also a second layer of PVC. An increase in the average ply adhesion was observed for each sample as compared with a reference sample having no compatibilizing agent, the results of which are also included in Table 1. The average ply adhesion increased from 1.8 lbf/in (no compatibilizing agent) to 2.8 lbf/in, 7.4 lbf/in, and 5.9 lbf/in for PPgMA, PEgMA, and KEE, respectively. Notably, the maximum ply adhesion was increased from 2.2 lbf/in (no compatibilizing agent) to 4.8 lbf/in, 13.5 lbf/in, and 9.3 lbf/in, for PPgMA, PEgMA, and KEE respectively.

TABLE 2

| | Ply Adhesion | | | |
|---|---|---|---|---|
| Compatibilization | Average Ply Adhesion (lbf/in) | Average Ply Adhesion Percentage Increase (%) | Maximum Ply Adhesion (lbf/in) | Maximum Ply Adhesion Percentage Increase (%) |
| No Compatibilization | | | | |
| Reference 50 mil membrane: 25 mil TPO/25 mil PVC | 1.8 | — | 2.2 | — |
| Compatibilizing Film (1 mil thick) between TPO Layer and PVC Layer | | | | |
| PEgMA | 17.5 | 972 | 24.7 | 1123 |

TABLE 2-continued

| | Ply Adhesion | | | |
| --- | --- | --- | --- | --- |
| Compatibilization | Average Ply Adhesion (lbf/in) | Average Ply Adhesion Percentage Increase (%) | Maximum Ply Adhesion (lbf/in) | Maximum Ply Adhesion Percentage Increase (%) |
| PPgMA | 15.2 | 844 | 20.8 | 945 |
| KEE | 7.2 | 400 | 13.2 | 600 |
| Compatibilizing Film (3 mil thick) between TPO Layer and PVC Layer | | | | |
| PEgMA | 8.2 | 456 | 9.6 | 436 |
| PPgMA | 9.2 | 511 | 11.5 | 523 |
| KEE | 5.4 | 300 | 6.3 | 286 |

Example 3. Compatibilizing Films (1 Mil Thickness) Between TPO Layer and PVC Layer A polymeric film of 100% PEgMA formed a compatibilizing film having a thickness of 1 mil and was positioned between a TPO first layer and a PVC second layer. There was no compatibilizing agent added to either the TPO first layer or the PVC second layer. The average ply adhesion, as shown in Table 2, increased from 1.8 lbf/in to 17.5 lbf/in, while the maximum ply adhesion increased from 2.2 lbf/in to 24.7 lbf/in. Additionally, the polymer film contained around 1 wt % maleic anhydride (MA) amount and an undisclosed amount of elastomer. This polymeric film of PEgMA represented 2 wt % compatibilizing agent with respect to the 50 mil membrane. Each of the TPO first layer and a PVC second layer had a thickness of 25 mil as formed using extrusion and calendaring methods as known in the art. Cohesive fracture was observed, indicating residuals of the polymer film on both TPO and PVC interior surfaces (surfaces in contact with the compatibilizing film). In general terms, adhesive joints may fail adhesively or cohesively. Adhesive failure is interfacial bond failure between the adhesive and the adherend, characterized by no significant transfer of material from the adhesive to the adherend during failure. Cohesive failure occurs when a fracture allows a layer of adhesive to remain on both surfaces. Observations of cohesive fracture are desirable because that means delamination between the TPO and PVC layers did not occur and indicates adhesion between the TPO and PVC layers is strong. In other words, the adhesion has exceeded the mechanical property limit of one or more of the membrane layers, therefore demonstrating that the bond between layers is stronger than the membrane layer or layers individually. This is indicative that the compatibilizing film has performed as desired to maximum effect by providing a strong TPO/PVC interface. Cohesive failure of such interface usually results in a much greater energy dissipation as compared to an adhesive failure, and is desirable for materials used in the construction industry, because failures tend to occur slowly over time, rather than in a brittle way, as observed in the case of adhesive failure.

Another sample hybrid roofing membrane included a PPgMA compatibilizing polymer film having a thickness of 1 mil that was positioned between a TPO first layer and a PVC second layer for bonding. Bonding of the compatibilizing polymer film to the TPO and PVC layers is performed by applying heat and pressure during the lamination manufacturing process, and without being bound by theory, resulting in the diffusion and entanglement of the polymer chains (between the compatibilizing layer and the PVC and between the compatibilizing layer TPO layer) in order to form a strong interface. The TPO and PVC layers included no compatibilizing agents. The average ply adhesion increased from 1.8 lbf/in to 15.2 lbf/in, while the maximum ply adhesion increased from 2.2 lbf/in to 20.8 lbf/in. The compatibilizing film included about 1 wt % MA amount. In yet another sample, a KEE compatibilizing polymer film having a thickness of 1 mil positioned between a TPO first layer and a PVC second layer, the average ply adhesion increased from 1.8 to 7.2 lbf/in, while the maximum ply adhesion increased from 2.2 to 13.2 lbf/in.

The TPO and PVC layers included no compatibilizing agents. In all cases, cohesive fracture was observed, indicating residuals of the polymer film on both TPO and PVC interior surfaces (surfaces in contact with the compatibilizing film). Results are summarized in Table 2.

Example 4. Compatibilizing Films (3 Mil Thickness) Between TPO Layer and PVC Layer Samples were made similarly to Example 3 except for employing a compatibilizing film having a thickness of 3 mil. A PEgMA compatibilizing polymer film (3 mil thick) disposed between a TPO first layer and a PVC second layer (neither layer having compatibilizing agents), the average ply adhesion was increased from 1.8 lbf/in to 8.2 lbf/in, while the maximum ply adhesion was increased from 2.2 lbf/in to 9.6 lbf/in. The compatibilizing film included about 1 wt % MA amount and an undisclosed amount of elastomer. The PEgMA compatibilizing polymer film represented 6 wt % compatibilizing agent with respect to the 50 mil hybrid roofing membrane. Adhesive fracture was mostly observed, indicating residuals of the polymer film on both TPO and PVC interior surfaces (surfaces in contact with the compatibilizing film).

Another sample hybrid roofing membrane included a PPgMA compatibilizing film (3 mil thick) between a TPO first layer and a PVC second layer (neither layer having compatibilizing agents). The average ply adhesion was increased from 1.8 lbf/in to 9.2 lbf/in, while the maximum ply adhesion was increased from 2.2 lbf/in to 11.5 lbf/in. The compatibilizing film contained about 1 wt % MA amount. In yet another example, a KEE compatibilizing polymer film (3 mil thick) between a TPO first layer and a PVC second layer (neither layer having compatibilizing agents), the average ply adhesion increased from 1.8 lbf/in to 5.4 lbf/in, while the maximum ply adhesion was increased from 2.2 lbf/in to 6.3 lbf/in. In all cases, mostly adhesive fracture was observed as with the other samples of Examples 3 and 4.

Example 5. Surface Treatment of One or Both of the TPO Layer and the PVC Layer Samples were made similarly to any one of Examples 1 to 4 except that the TPO surface and/or the PVC surface included a plasma surface treatment. As a result of the treatment, functional groups such as carbonyl, carboxyl, and hydroxyl groups were formed on the treated surface (e.g., the TPO layer and/or the PVC layer), using a power input of from about 10 to about 200 W and a flow rate from about 1 to about 50 sccm. The surface treatment was in addition to a compatibilization agent being incorporated into at least one of the TPO layer and/or the PVC layer (as in Examples 1 and 2) and/or a compatibilizing film being disposed between at least one of the TPO layer and/or the PVC layer (as in Examples 3 and 4). Alternatively, ozone or corona surface treatment were used to treat the surface similarly as the plasma surface treatment was performed to form functional groups on the polymeric surface.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the device" includes reference to one or more devices and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A roofing membrane, comprising:
a first layer comprising a first polymer material;
a second layer comprising a second polymer material, the second polymer material being different than the first polymer material;
a reinforcing scrim disposed between the first layer and the second layer; and
at least one compatibilizing film disposed between the first layer and the second layer;
wherein the at least one compatibilizing film comprises at least one polymer chosen from styrene-ethylene/butylene-styrene (SEBS), polypropylene grafted maleic anhydride (PPgMA), polyethylene grafted maleic anhydride (PEgMA), ketone ethylene ester (KEE), chlorinated polyethylene (CPE), styrene-butyldiene-styrene (SBS), or combinations thereof;
wherein at least one of the first polymer material and the second polymer material is compatibilized via the at least one compatibilizing film so that the first polymer material is chemically compatible with the second polymer material and so that the roofing membrane comprises between 0.5-15% of the at least one polymer; and
wherein the at least one compatibilizing film is attached without the use of an adhesive.

2. The roofing membrane of claim 1, wherein the reinforcing scrim is disposed between a first compatibilizing film and a second compatibilizing film, the first compatibilizing film being positioned adjacent to the first layer and the second compatibilizing film being positioned adjacent to the second layer.

3. The roofing membrane of claim 1, wherein the first polymer material is thermoplastic polyolefin (TPO).

4. The roofing membrane of claim 1, wherein the second polymer material is polyvinyl chloride (PVC).

5. The roofing membrane of claim 4, wherein the first polymer material is thermoplastic polyolefin (TPO), and wherein a ply adhesion of the first layer and the second layer is at least two times greater than a reference roofing membrane that is devoid of the compatibilizing film.

6. The roofing membrane of claim 1, wherein the first layer has a first thickness and the second layer has a second thickness, wherein the second thickness is at most equal to the first thickness.

7. The roofing membrane of claim 1, wherein a compatibilizing agent is added to at least one of the first layer and the second layer.

8. The roofing membrane of claim 1, wherein the compatibilizing film thickness is from 0.5 mil to 5 mil.

9. A roofing system, comprising:
at least one support member, the at least one support member defining a roof surface;
an insulation layer positioned atop the at least one support member on the roof surface; and
a roofing membrane positioned atop the insulation layer and coupled with the roof surface, the roofing membrane comprising:
a first layer comprising a first polymer material;
a second layer comprising a second polymer material, the second polymer material being different than the first polymer material;
a reinforcing scrim disposed between the first layer and the second layer; and
a compatibilizing film disposed between the first layer and the second layer, wherein the compatibilizing film compatibilizes the first layer and/or the second layer so that the first layer and the second layer are chemically compatible, the compatibilizing film comprising at least one polymer chosen from styrene-ethylene/butylene-styrene (SEBS), polypropylene grafted maleic anhydride (PPgMA), polyethylene grafted maleic anhydride (PEgMA), ketone ethylene ester (KEE), chlorinated polyethylene (CPE), styrene-butyldiene-styrene (SBS), and combinations thereof;
wherein the roofing membrane comprises between 0.5-15% of the at least one polymer; and
wherein the compatibilizing film is attached without the use of an adhesive.

10. The roofing system of claim 9, wherein the reinforcing scrim is disposed between a first compatibilizing film and a second compatibilizing film, the first compatibilizing film being positioned adjacent to the first layer and the second compatibilizing film being positioned adjacent to the second layer.

11. The roofing system of claim 9, wherein the first polymer material is thermoplastic polyolefin (TPO).

12. The roofing system of claim 9, wherein the second polymer material is polyvinyl chloride (PVC).

13. The roofing system of claim 9, wherein the at least one support member comprises a metal deck, a wood deck, a concrete deck, or a combination thereof.

14. The roofing system of claim 9, wherein the insulation layer comprises foam insulation boards, cover boards, or a combination thereof.

15. A method of making a roofing membrane, the method comprising:

extruding a thermoplastic polyolefin (TPO) material to form a first layer of the roofing membrane;

extruding a polyvinyl chloride (PVC) material atop the TPO material to form a second layer of the roofing membrane;

positioning a reinforcing scrim between the first layer and the second layer;

compatibilizing at least one of the TPO material and the PVC material by positioning at least one compatibilizing film between the TPO material and the PVC material so that the TPO material is chemically compatible with the PVC material; and bonding the TPO material to the PVC material without the use of an adhesive to form the roofing membrane;

wherein the compatibilizing film comprises at least one polymer chosen from styrene-ethylene/butylene-styrene (SEBS), polypropylene grafted maleic anhydride (PPgMA), polyethylene grafted maleic anhydride (PEgMA), Elvaloy® ketone ethylene ester (KEE), chlorinated polyethylene (CPE), styrene-butyldiene-styrene (SBS), and combinations thereof;

wherein the roofing membrane comprises between 0.5-15% of the at least one polymer; and wherein the at least one compatibilizing film is attached without the use of an adhesive.

16. The method of claim 15, wherein the reinforcing scrim is positioned between a first compatibilizing film and a second compatibilizing film, the first compatibilizing film adjacent to the TPO material and the second compatibilizing film adjacent to the PVC material.

\* \* \* \* \*